FIG. 3

| Group 1 | | Group 2 | |
|---|---|---|---|
| Gate GA No. | Elements connected thereto | Gate GA No. | Elements connected thereto |
| 1 | 1  2 | 6 | 1  3 |
| 2 | 2  3 | 7 | 2  4 |
| 3 | 3  4 | 8 | 3  5 |
| 4 | 4  5 | 9 | 4  1 |
| 5 | 5  1 | 10 | 5  2 |

FIG. 4

| Group 1 | | Group 2 | |
|---|---|---|---|
| Gate GA No. | Elements connected thereto | Gate GA No. | Elements connected thereto |
| 1 | 3  4  5 | 6 | 2  4  5 |
| 2 | 1  4  5 | 7 | 1  3  5 |
| 3 | 1  2  5 | 8 | 1  2  4 |
| 4 | 1  2  3 | 9 | 2  3  5 |
| 5 | 2  3  4 | 10 | 1  3  4 |

Inventor
R. G. MILLS
By *Robert M Harding Jr*
Attorney

FIG. 5

| Group 1 | | Group 2 | | Group 3 | |
|---|---|---|---|---|---|
| Gate GA No. | Elements connected thereto | Gate GA No. | Elements connected thereto | Gate GA No. | Elements connected thereto |
| 1 | 1  2 | 1 | 1  3 | 1 | 1  4 |
| 2 | 2  3 | 2 | 2  4 | 2 | 2  5 |
| 3 | 3  4 | 3 | 3  5 | 3 | 3  6 |
| 4 | 4  5 | 4 | 4  6 | 4 | 5  1 |
| 5 | 5  6 | 5 | 6  1 | 5 | 6  2 |

FIG. 6

| Group 1 | | Group 2 | | Group 3 | |
|---|---|---|---|---|---|
| Gate GA No. | Elements connected thereto | Gate GA No. | Elements connected thereto | Gate GA No. | Elements connected thereto |
| 1 | 2  4  5 | 1 | 1  3  4 | 1 | 1  2  3 |
| 2 | 2  3  5 | 2 | 2  3  6 | 2 | 1  5  6 |
| 3 | 1  3  5 | 3 | 1  4  5 | 3 | 1  2  6 |
| 4 | 2  4  6 | 4 | 3  4  6 | 4 | 4  5  6 |
| 5 | 1  3  4  6 | 5 | 1  2  5  6 | 5 | 2  3  4  5 |

Inventor
R. G. MILLS

June 20, 1961 R. G. MILLS 2,989,740
ELECTRONIC REGISTERING EQUIPMENT
Filed March 28, 1956 6 Sheets-Sheet 5

FIG. 7

| Group 1 | | Group 2 | |
|---|---|---|---|
| Gate GA No. | Elements connected thereto | Gate GA No. | Elements connected thereto |
| 1 | 1 2 3 | 1 | 1 2 4 |
| 2 | 2 3 4 | 2 | 2 3 5 |
| 3 | 3 4 5 | 3 | 3 4 6 |
| 4 | 4 5 6 | 4 | 4 5 7 |
| 5 | 5 6 7 | 5 | 5 6 1 |
| 6 | 6 7 1 | 6 | 6 7 2 |
| 7 | 7 1 2 | 7 | 7 1 3 |
| 8 | 1 3 5 | 8 | 1 3 4 |
| 9 | 2 4 6 | 9 | 2 4 5 |
| 10 | 3 5 7 | 10 | 3 5 6 |
| 11 | 4 6 1 | 11 | 4 6 7 |
| 12 | 5 7 2 | 12 | 5 7 1 |
| 13 | 6 1 3 | 13 | 6 1 2 |
| 14 | 7 2 4 | 14 | 7 2 3 |
| 15 | 1 2 5 | | |
| 16 | 2 3 6 | | |
| 17 | 3 4 7 | | |
| 18 | 4 5 1 | | |
| 19 | 5 6 2 | | |
| 20 | 6 7 3 | | |
| 21 | 7 1 4 | | |

Inventor
R. G. MILLS
By *Robert Harding*
Attorney

FIG. 8

| Group 1 | | Group 2 | |
|---|---|---|---|
| Gate GA No. | Elements connected thereto | Gate GA No. | Elements connected thereto |
| 1 | 4 5 6 7 | 1 | 3 5 6 7 |
| 2 | 5 6 7 1 | 2 | 4 6 7 1 |
| 3 | 6 7 1 2 | 3 | 5 7 1 2 |
| 4 | 7 1 2 3 | 4 | 6 1 2 3 |
| 5 | 1 2 3 4 | 5 | 7 2 3 4 |
| 6 | 2 3 4 5 | 6 | 1 3 4 5 |
| 7 | 3 4 5 6 | 7 | 2 4 5 6 |
| 8 | 2 4 6 7 | 8 | 2 5 6 7 |
| 9 | 3 5 7 1 | 9 | 3 6 7 1 |
| 10 | 4 6 1 2 | 10 | 4 7 1 2 |
| 11 | 5 7 2 3 | 11 | 5 1 2 3 |
| 12 | 6 1 3 4 | 12 | 6 2 3 4 |
| 13 | 7 2 4 5 | 13 | 7 3 4 5 |
| 14 | 1 3 5 6 | 14 | 1 4 5 6 |
| 15 | 3 4 6 7 | | |
| 16 | 4 5 7 1 | | |
| 17 | 5 6 1 2 | | |
| 18 | 6 7 2 3 | | |
| 19 | 7 1 3 4 | | |
| 20 | 1 2 4 5 | | |
| 21 | 2 3 5 6 | | |

United States Patent Office 2,989,740
Patented June 20, 1961

2,989,740
ELECTRONIC REGISTERING EQUIPMENT
Ronald Gerald Mills, London, England, assignor to International Standard Electric Corporation, New York, N.Y., a corporation of Delaware
Filed Mar. 28, 1956, Ser. No. 574,423
Claims priority, application Great Britain Apr. 1, 1955
5 Claims. (Cl. 340—253)

This invention relates to pattern registers particularly those used for storing coded information.

The object of the invention is to determine whether, in a pattern register consisting of a number of stages the number of stages in one of two alternative states differs from a given number.

According to the invention, there is provided equipment for determining whether, in a multi-stage pattern register, the number of stages which are in one of two alternative stable conditions differs from a given number comprising a plurality of groups of gates, means for connecting the gates comprising a group to the outputs of the stages of said register, each gate of a group being connected to a different combination of said register stages in a predetermined arrangement, a bi-stable circuit connected to each group of gates, said circuit being normally in a first stable condition, the arrangement of connecting the different combinations of said register stages being such that no more than one of said bi-stable circuits will assume its second stable condition when said given number of register stages are in said one stable condition, but more than one of said bi-stable circuits will assume their second stable condition when more than said given number of register stages are in said one stable condition, and signal means connected to said bi-stable circuits and responsive to a plurality of said bi-stable circuits being in their second stable condition for producing a signal.

The above-mentioned and other features and objects of this invention and the manner of attaining them will become more apparent and the invention itself will be best understood by reference to the following description of an embodiment of the invention taken in conjunction with the accompanying drawings, in which:

FIGS. 3-8 are tabular statements relating to different embodiments of the invention according to two of the methods described.

Figure 1:
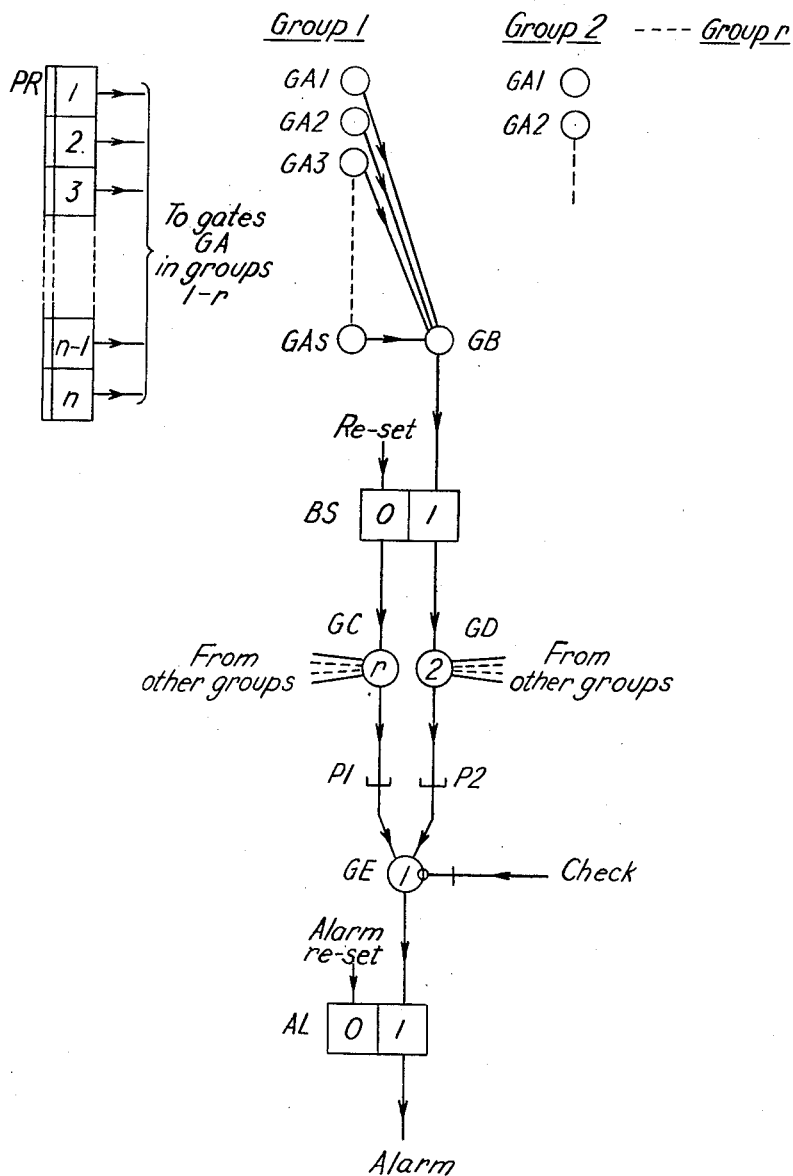
FIG. 1 represents the basic principle of the invention.

In FIG. 1, a pattern register PR consists of $n$ stages, which may for example be valves. It is desired that an alarm should be operated if any number other than $m$ out of these $n$ valves is fired. To achieve this, the $n$ valves are connected to gates GA, which are arranged in $r$ groups. In each group, the gates GA, numbered 1 to $s$, are each connected to a gate GB. The stages of the pattern register PR are connected to the gates GA, and the gates GA are arranged in groups, in such a way that, when $m$ valves in the pattern register PR are fired, one, and only one, gate GB opens. These connections and groupings are discussed later. A bi-stable trigger device BS, normally in position 0, is associated with each gate GB, so that when the gate BG opens, the trigger device BS takes up position 1. Two common gates GC, GD are provided, each connected to the trigger device BS of each of the $r$ groups. The gate GC opens if all the trigger devices BS are in position 0; that is to say, when less than $m$ valves in the pattern register PR have been fired, and none of the gates GB has therefore opened. The gate GD opens if two of the trigger devices BS are in position 1; that is to say, when more than $m$ valves in the pattern register PR have been fired, and two of the gates GB have opened. A governing gate GE is connected to the gates GC, GD. The gate GE opens, under the control of a check pulse, if either the gate GC or the gate GD is open. The gate GE is connected to a bi-stable trigger device AL, which assumes position 1 and completes an alarm circuit when the gate GE opens.

The circuit is prepared for use by applying a reset pulse to the trigger devices BS and an independent reset pulse, when required, to the trigger device AL. To prevent operating the alarm when the trigger devices BS are reset, it is arranged that the governing gate GE cannot open in the absence of the check pulse. If the circuit is applied to more than one pattern register, the arrangements described above are applied to each register. The outlets from the gates GC, however, may be commoned at the point P1, and the outlets from the gates GD may be commoned at the point P2. With this arrangement, the gate GE and the trigger device AL are shared by all the pattern registers.

The successful operation of the circuit depends on the type of the gates GA and GB, the satisfactory connection of the stages of the pattern register PR to the gates GA, and on the satisfactory arrangement of the gates GA in groups. The connections and the arrangement adopted in any case will depend on the particular values of $m$ and $n$. There are, however, two distinct methods which may be applied. With the first method, each gate GA is a coincidence gate and opens when all the valves, or stages, with which it is connected are fired, and the gate GB is a coupling or mixing gate and opens when any gate GA in the group is open. With the second method, each gate GA is a coupling or mixing gate and opens when any valve, or stage, with which it is connected is fired, and the gate GB is a coincidence gate and opens only if all the gates GA in the group are open. The application of these methods will be better understood by reference to the examples given in FIGS. 2-8.

Figure 2:
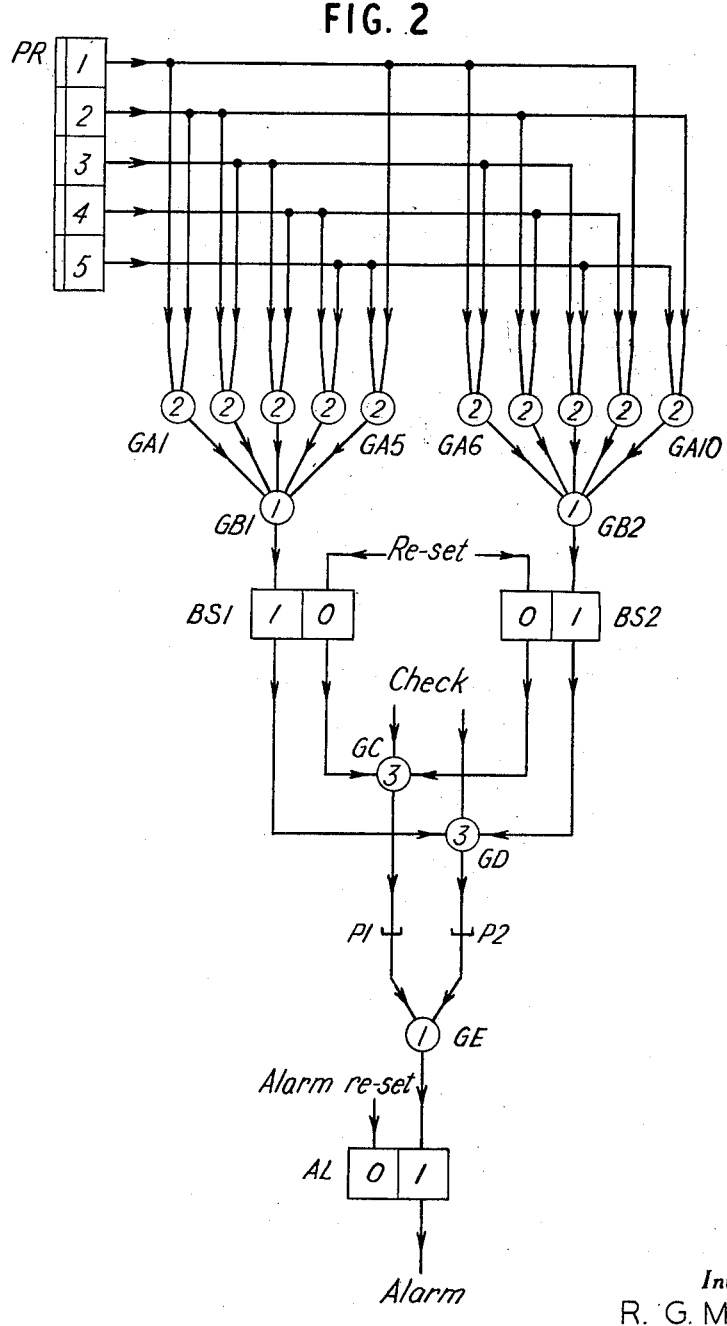
FIG. 2 represents an embodiment of the invention according to one of the methods described.

FIG. 2 shows a pattern register PR composed of five stages which may be valves. It is desired to operate an alarm if any number other than two valves in the pattern register is fired. The circuit operates in accordance with the first method mentioned above, and embodies an alternative way of applying the check pulse to that shown in FIG. 1.

A coincidence gate GA is provided for each combination of two out of the five valves in the pattern register PR. These gates are arranged in two groups, gates GA1 to GA5 comprising group 1, and gates GA6 to GA10 comprising group 2. In the first group, each gate GA is connected to two valves which are adjacent to one another in the pattern register PR, it being assumed for this purpose that the pattern register is cyclic and that valve 5 is adjacent to valve 1. In the second group, each gate is connected to two valves which are not adjacent to each other in the pattern register. Gates GB, GC, GD, GE, bi-stable trigger devices BS, AL and commoning points P1, P2 are provided as described in connection with FIG. 1. The check pulse, however, is fed to the gates GC, GD instead of to the gate GE.

Each of the gates GA1-10 opens only when both the valves connected to it are fired; that is, two valves form the coincidence controls of any one gate. Consequently when two valves are fired, one and only one of the gates GA opens. This is followed by the opening of the appropriate gate GB, since each gate GA is an individual control for its associated gate GB. The corresponding trigger device BS is then actuated. For example, if the valves 1 and 3 are fired, the gate GA6 will open, followed by the gate GB2. The trigger device BS2 will then assume position 1. The other trigger device BS1 remains at position 0. Consequently, the check pulse will be unable to pass either the gate GC or the gate GD and the alarm will not be operated.

If, now, it is assumed that valve 4 is fired in addition to valves 1 and 3, the gates GA9 and GA3 will open in addition to gate GA6. The gate GB1 opens by reason of the gate GA3, in addition to the gate GB2, and both the trigger devices BS1, BS2 assume position 1. The check pulse will then pass the gate GD, opening the gate GE and actuating the trigger device AL to complete the alarm circuit.

If less than two valves is fired, none of the gates GA, GB open, both trigger devices BS remain at position 0 and the check pulse passes the gate GC to operate the alarm.

The connections between the valves of the pattern register and the gates GA, and the arrangement of the gates GA in groups are shown in tabular form in FIG 3.

FIG. 4 is a tabular statement of the connections and grouping arrangements for a three-out-of-five checking circuit according to the second method mentioned above. Assume, again, that valves 1 and 3 are fired. With this arrangement, each of the gates GA which is connected to either valve 1 or valve 3 will open; in fact, the gate GA6 will be the only gate that remains closed. The gates GB only open if all the gates in the group concerned are open. The gate GB1, therefore, will open, but the gate GB2 will remain closed. Consequently, the check pulse will be unable to pass either of the gates GC, GD and the alarm will not be operated.

If any of the remaining valves is fired, the gate GA6 will also open, both gates GB1 and GB2 will open, and the check pulse will pass the gate GD to operate the alarm. If only one valve is fired, both gates GB1 and GB2 will remain closed and the alarm circuit will be operated. If no valve is fired, none of the gates GA, GB will open, and the check pulse will pass gate GC to operate the alarm.

The connections and grouping arrangements for other pattern registers are shown, by way of example, in FIGS. 5–8. FIG. 5 shows particulars relating to a two-out-of-six pattern register which is checked according to the first method described in connection with FIG. 1, and FIG. 6 shows the second method applied to the same pattern register. FIG. 7 shows particulars relating to a three-out-of-seven pattern register which is checked according to the first method described in connection with FIG. 1, and FIG. 8 shows the second method applied to a three-out-of-seven pattern register. In any given case it may also be possible to design a circuit based partly on the first method and partly on the second method.

While I have described above the principles of my invention in connection with specific apparatus, it is to be clearly understood that this description is made only by way of example and not as a limitation to the scope of my invention as set forth in the objects thereof and in the accompanying claims.

What I claim is:

1. Indicating equipment for indicating whether, in an electronic register consisting of a number of stages, the number of stages in one of two alternative states differs from a given number, comprising a first set of multi-input gates connected to the outputs of the respective stages in a matrix pattern corresponding to said given number and arranged in groups, a second set of multi-input gates, one for each group of gates of said first set, each gate of said second set having an input connected to each of the outputs of the gates of its associated first set, a plurality of bi-stable devices corresponding in number to the number of gates in said second set, each device having a normal stable condition and having an input coupled to the output of its associated gate, a third set of two multi-input gates, each gate of said third set having inputs connected to corresponding portions of said bi-stable devices, detector means coupled to said third set of gates for detecting whether more than one of said bi-stable devices has assumed an abnormal stable condition, and indication means coupled to said detector means and responsive to more than a predetermined number of said bi-stable devices being in an abnormal stable condition for producing an indication.

2. Indicating equipment as claimed in claim 1, wherein said indication means comprises a source of check pulses coupled to said inputs of said third set of gates, whereby when more than a predetermined number of said bi-stable devices assumes abnormal position, a gate in said third set opens to permit a signal from said source to pass therethrough.

3. Indicating equipment as claimed in claim 1, wherein the gates of said first set are two input coincidence gates, the gates of said second set are single input gates, and the gates of said third set are three input coincidence gates.

4. Indicating equipment as claimed in claim 1, wherein said bi-stable devices are flip-flop circuits having their normally operating stages coupled to the inputs of one of the gates of said third set and having their abnormally operating stages coupled to the inputs of the other one of the two gates of said third set.

5. Indicating equipment as set forth in claim 1 wherein the said matrix pattern of connections between the gates of the first set and the electronic register stages includes connections between the inputs of each gate of the first set and a different combination of said given number of register stages, the last said connections being divided among the groups of gates in the first set so that at least one gate in each of said groups of first set gates will open when more than said given number of register states are operated.

References Cited in the file of this patent

UNITED STATES PATENTS

| 2,628,346 | Burkhart | Feb. 10, 1953 |
| 2,674,733 | Robbins | Apr. 6, 1954 |
| 2,675,538 | Malthaner, et al. | Apr. 13, 1954 |
| 2,675,539 | McGuigan | Apr. 13, 1954 |
| 2,685,683 | Holden, et al. | Aug. 3, 1954 |
| 2,719,959 | Hobbs | Oct. 4, 1955 |
| 2,724,104 | Wild | Nov. 15, 1955 |
| 2,769,971 | Baske | Nov. 6, 1956 |
| 2,804,606 | Reaves | Aug. 27, 1957 |
| 2,885,655 | Smoliar | May 5, 1959 |